(12) United States Patent
Yang

(10) Patent No.: US 7,350,958 B2
(45) Date of Patent: Apr. 1, 2008

(54) LIGHT GUIDE PLATE OF LED BACKLIGHT UNIT

(75) Inventor: Sung Min Yang, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/602,303

(22) Filed: Nov. 21, 2006

(65) Prior Publication Data

US 2007/0115689 A1    May 24, 2007

(30) Foreign Application Priority Data

Nov. 23, 2005   (KR) .................. 10-2005-0112541

(51) Int. Cl.
   *F21V 7/04*   (2006.01)
(52) U.S. Cl. ............... 362/621; 362/610; 349/65; 385/901
(58) Field of Classification Search ........... 362/610, 362/612, 613, 621; 349/65; 385/146, 901
   See application file for complete search history.

(56) References Cited

U.S. PATENT DOCUMENTS 6,065,845 A * 5/2000 Miyazaki ............... 362/612

FOREIGN PATENT DOCUMENTS

KR    2003-0043257    6/2003

OTHER PUBLICATIONS

Korean Office Action issued in corresponding Korean Patent Application No. 10-2005-0112541, dated Feb. 20, 2007.

* cited by examiner

*Primary Examiner*—Stephen F Husar
(74) *Attorney, Agent, or Firm*—McDermott Will & Emery LLP

(57) ABSTRACT

A light guide plate of an LED backlight unit is disclosed. The light guide plate comprises a pair of wide planes facing each other, and a narrow plane formed between the pair of wide planes and constituting a thickness of the light guide plate. The narrow plane has an incident plane formed on a section of the narrow plane facing the LED light source, and one of the wide planes constitutes an exiting plane from which light entered from the LED light source exits. The incident plane has a plurality of elliptic cylinder-shaped grooves carved into the incident plane in a thickness direction of the light guide plate. As such, the elliptic cylinder-shaped grooves are carved into the incident plane of the light guide plate in the thickness direction, widening an incidence angle of which light can be transmitted therethrough.

7 Claims, 10 Drawing Sheets

LIGHT GUIDE PLATE OF LED BACKLIGHT UNIT

CLAIM OF PRIORITY

The present invention is based on, and claims priority from, Korean Application Number 2005-112541, filed Nov. 23, 2005, the disclosure of which is incorporated by reference herein in its entirety.

BACKGROUND OF THE INVENTION

1. Field of the Invention

The present invention relates to a light guide plate of a light emitting device (LED) backlight unit, and, more particularly, to a light guide plate of an LED backlight unit, which has a plurality of elliptic cylinder-shaped grooves carved into an incident plane of the light guide plate in a thickness direction to widen an incidence angle of which light can be transmitted therethrough.

2. Description of the Related Art

A small light crystal display (LCD) for mobile phones and personal digital assistants (PDA) generally employs a lateral light emitting diode (LED) as a light source of a backlight unit. Such a lateral LED is generally provided to the backlight unit as shown in FIG. 1.

Referring to FIG. 1, the backlight unit 10 comprises a planar light guide plate 20 disposed on a substrate 12, and a plurality of lateral LEDs 30 (only one lateral LED is shown in FIG. 1) disposed in an array on a lateral side of the light guide plate 20. Light L entered the light guide plate 20 from the LED 30 is reflected upwardly by a minute reflection pattern 22 and a reflection sheet (not shown) positioned at the bottom of the light guide plate 20, and exits from the light guide plate 20, providing back light to an LCD panel 40 above the light guide plate 20.

Such a backlight unit 20 suffers from a problem as shown in FIG. 2 when light is incident on the light guide plate 20 from the LED 30.

As shown in FIG. 2, light L emitted from each LED 30 is refracted toward the light guide plate 20 by a predetermined angle θ due to difference in refractive index between media according to Snell's Law when the light L enters the light guide plate 20. In other words, even through the light L is emitted at a beam angle of α1 from the LED 30, it is incident on the light guide plate 20 at an incidence angle of α2 less than α1. In FIG. 3, such an incidence profile of light L is shown.

Therefore, there is a problem of increasing a length (l) of a combined region where beams of light L entered the light guide plate 20 from the respective LEDs 30 are combined. In addition, light spots H also called "Hot spots" and dark spots D are alternately formed in the region corresponding to the length (l) on the incident plane of the light guide plate 20. Each of the light spots H is formed at a location facing the LED 30, and each of the dark spots D is formed between the light spots H.

Since the alternately formed light and dark spots are unnecessary for the light guide plate, they must be completely removed, if possible. Even though the light and dark spots are not completely removed, the length (l) must be shortened as much as possible. For this purpose, it is necessary to increase an angle of light entering the light guide plate, that is, an incidence angle of light.

For this purpose, it is suggested to form protrusions on the side surface of the light guide plate as shown in FIG. 4.

Specifically, if a plurality of fine prism-shaped protrusions 24 are formed on a side surface of a light guide plate 20A, light L can enter the light guide plate at an incidence angle α3 substantially equal to an orientation angle α1 of light emitted from a focal point F of a light source. Thus, if orientation angles α1 of light beams emitted from the focal point F of the light source are identical, the light L enters the light guide plate at an incidence angle α3 wider than the case of FIGS. 2 and 3. As a result, it is possible to reduce the problem described in FIG. 2.

Alternatively, a plurality of semi-circular fine protrusion may be formed on the side surface of a light guide plate 20B as shown in FIG. 5. With this configuration, it is possible to obtain the same advantage as that of the configuration shown in FIG. 4.

However, the configurations of FIGS. 4 and 5 suffer from problems as follows.

The light guide plate is generally formed by injection molding of a transparent resin by means of a mold. For example, in the case of forming the light guide plate 20B as shown in FIG. 5, a mold 50 having a shape corresponding to that of the light guide plate 20B carved therein as shown in FIG. 6 is used.

An inner surface of the mold 50 is formed with carved protrusions 52 corresponding to the protrusions 26 of the light guide plate 20B of FIG. 5. Since each of the protrusions 52 has a sharp distal end 54, there is a difficulty in forming the protrusions 52, and even though the protrusions 52 are formed, they can be easily deformed.

Furthermore, in order to allow the mold 50 to be easily separated from the light guide plate after forming the light guide plate by filling the mold 50 with the resin, a release agent is applied to the inner surface of the mold 50. Thus, when the carved protrusions 52 have the sharp distal ends 54, the release agent is often insufficiently or hardly applied to the distal ends 54. As a result, the resin is brought into direct contact with the distal ends 54 of the protrusions 52, so that the light guide plate of the resin is stuck to the protrusions 52 of the mold 50, and is unlikely to be separated from the mold 50 when opening the mold 50 later. Moreover, the light guide plate is likely to be broken at a portion thereof due to an impact upon separation, which increases frequency of defective light guide plates.

Such problems also occur for the light guide plate 20A shown in FIG. 4. That is, since the protrusions 52 are formed on the inner surface of the mold 50 for molding the light guide plates 20A and 20B, the conventional light guide plate causes difficulty in molding operation, and suffers from defective molding.

As an approach to avoid these problems, although it is possible to form the above light guide plates 20A and 20b by cutting away the protrusions 24 or 26 from the side surface of the transparent resin plate, this causes deterioration in operability.

Accordingly, there are needs of a new technique which can overcome the problems related to formability of the light guide plate described above while allowing the fine protrusions to be formed on the side surface of the light guide plate.

SUMMARY OF THE INVENTION

The present invention has been made to solve the above problems, and it is an object of the present invention to provide a light guide plate of an LED backlight unit, which has a plurality of elliptic cylinder-shaped grooves carved into an incident plane of the light guide plate in a thickness direction to widen an incidence angle of which light can be transmitted therethrough.

It is another object of the present invention to provide the light guide plate which has grooves formed on the incident plane of the light guide plate, and a pinnacle between the grooves, thereby enabling easy operation of producing a mold for the light guide plate while ensuring easy and stable production of the light guide plate using the mold.

In accordance with one aspect of the present invention, the above and other objects can be accomplished by the provision of a planar light guide plate for a backlight unit having an LED light source, comprising: a pair of wide planes facing each other; and a narrow plane formed between the pair of wide planes and constituting a thickness of the light guide plate, wherein the narrow plane has an incident plane constituted on a section of the narrow plane facing the LED light source, the incident plane having a plurality of elliptic cylinder-shaped grooves carved into the incident plane in a thickness direction of the light guide plate, and one of the wide planes constitutes an exiting plane from which light entered from the LED light source exits.

Preferably, the carved elliptic cylinder-shaped grooves extend in a thickness direction of the exiting plane of the light guide plate such that ellipses corresponding to the respective elliptic cylinder-shaped grooves are partially overlapped with each other.

Each overlapped portion between the ellipses may form a pinnacle extending outward from the incident plane between the elliptic cylinder-shaped grooves. In addition, each overlapped portion between the ellipses may have a width 10~30% of that of the ellipses. The ellipses may have a ratio of a major axis to a minor axis in the range of 1.5:1~3:1, and preferably in the range of 1.8:1~2.2:1. In addition, the ellipses may have a major axis of 2~6 mm in length, and a minor axis of 1~3 mm in length.

Each of the elliptic cylinder-shaped grooves may be formed on a plane in which an extension between both ends of the major axis of the ellipse indented into the incident plane is parallel to the incident plane.

BRIEF DESCRIPTION OF THE DRAWINGS

The above and other objects, features and other advantages of the present invention will be more clearly understood from the following detailed description taken in conjunction with the accompanying drawings.

DESCRIPTION OF THE PREFERRED EMBODIMENTS

Preferred embodiments will now be described in detail with reference to the accompanying drawings.

Figure 7:
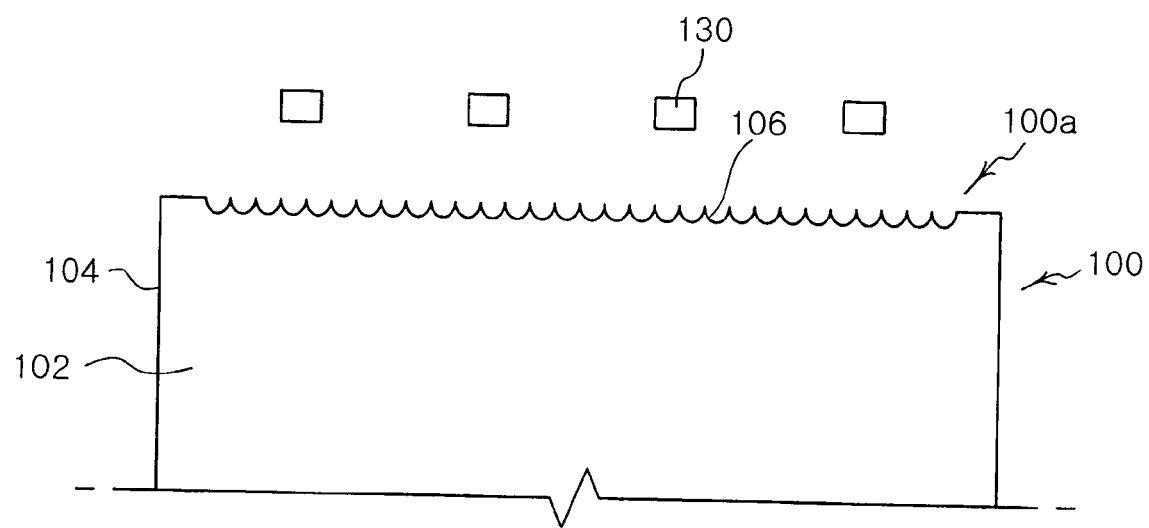
FIG. 7 is a plan view showing an incident plane of a light guide plate according to the present invention.
Figure 8:
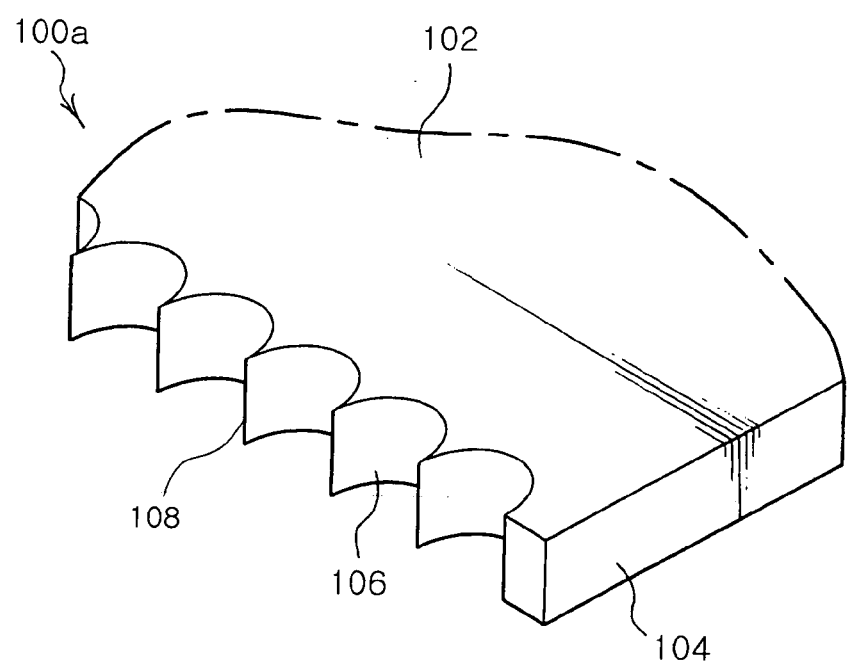
FIG. 8 is a perspective view of the light guide plate shown in FIG. 7.

FIG. 7 is a plan view showing an incident plane of a light guide plate according to the invention, and FIG. 8 is a perspective view of the light guide plate shown in FIG. 7.

Figure 1:
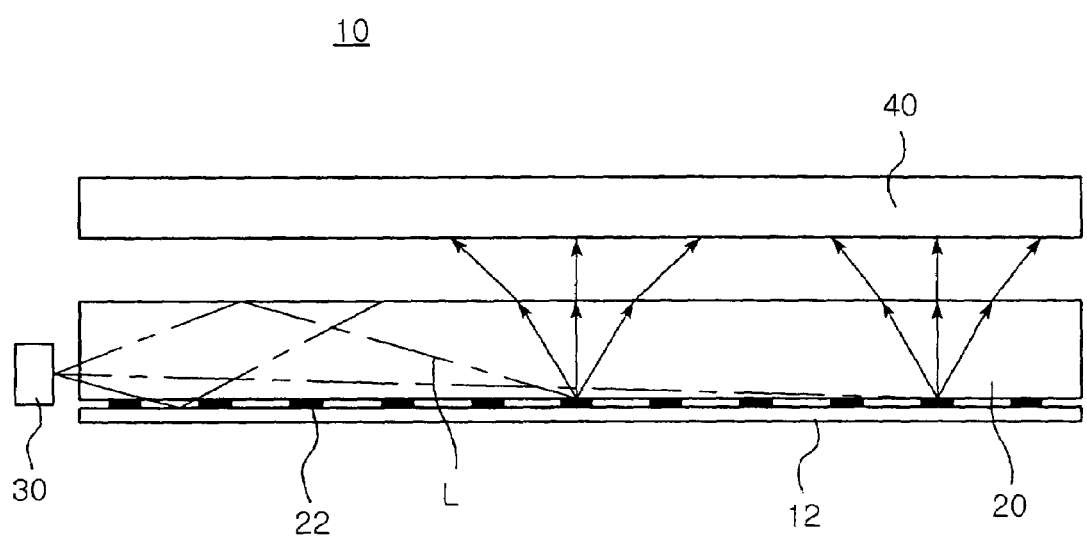
FIG. 1 is a side section view of a conventional backlight unit.

Referring to FIGS. 7 and 8, a light guide plate 100 is used for a backlight unit having an LED light source, and has substantially the same arrangement as that shown in FIG. 1.

The light guide plate 100 has a planar shape, and is made from a transparent glass, plastic acryl, or PMMA (polymethylmethacrylate).

The light guide plate 100 comprises a pair of wide planes, that is, upper and lower surfaces 102, facing each other, and narrow planes, that is, side surfaces 104, formed between the wide planes 102 and constituting a thickness of the light guide plate. One of the narrow planes facing the LED light source 130, that is, one narrow plane at a leading end 100a of the light guide plate 100, constitutes an incident plane, which has a plurality of grooves 106 having a shape as shown in FIG. 8. The grooves 106 have an elliptic cylinder shape, and are carved into the incident plane 104a of the light guide plate 100 in a thickness direction thereof.

Figure 9:
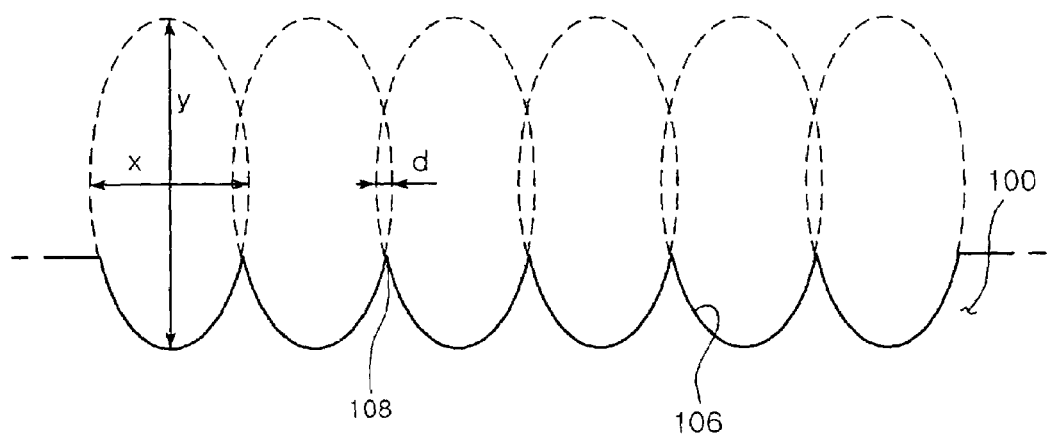
FIG. 9 is a concept view illustrating the shape of the incident plane of the light guide plate shown in FIG. 7.

Each of the grooves 106 has a cross-sectional shape of a portion of an ellipse as is clearly shown in FIG. 9. The grooves 106 are formed in the carved elliptic cylinder shape in the thickness direction on the incident plane of the light guide plate 100 such that plural ellipses corresponding to the respective carved elliptic cylinder shapes are partially overlapped with each other.

In FIG. 9, when the major axis and the minor axis of an ellipse for each groove 106 are defined as y and x, respectively, an overlapped distance "d" between the ellipses is preferably 10~30% of a total length of all the minor axes, and more preferably about 20% of the total length of all the minor axes.

In addition, a ratio of the major axis (x) to the minor axis (y) is in the range of 1.5:1~3:1, and preferably in the range of 1.8:1~2.2:1.

Such an overlapped distance "d," major axis (y), and a minor axis (x) of the ellipses are determined for the purpose of optimizing an incidence angle of light entering the light guide plate 100 from the light source.

Figure 10:
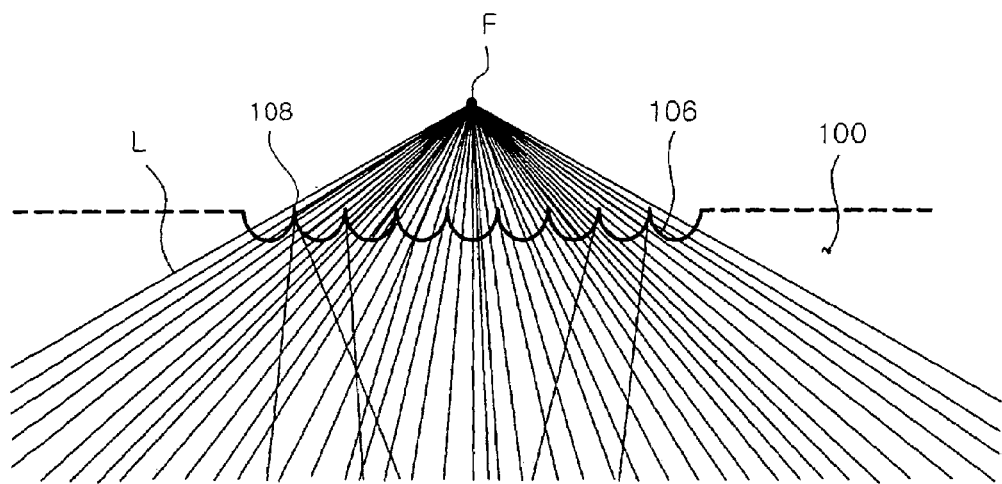
FIG. 10 is a plan view showing an incidence path of light on the incident plane of the light guide plate according to the present invention.

This structure will be described in more detail with reference to FIG. 10, which is a plan view showing an incidence path of light on the incident plane of the light guide plate according to the present invention.

Figure 4:
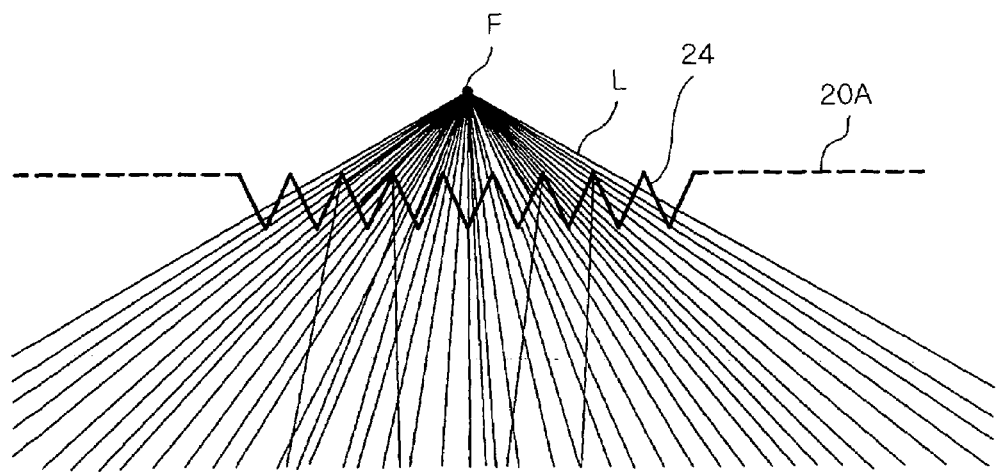
FIG. 4 is a plan view showing an incidence path of light on an incident plane of an improved light guide plate of a conventional technique.
Figure 5:
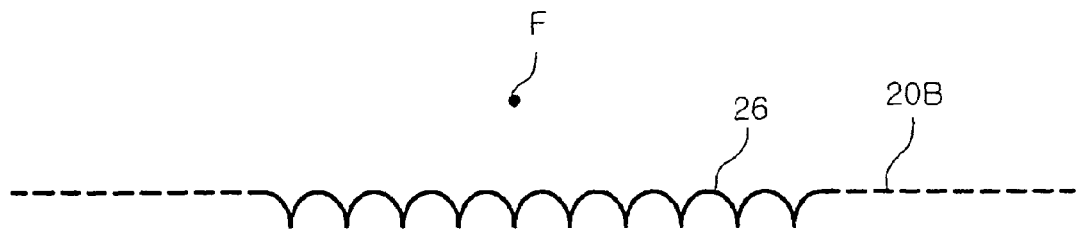
FIG. 5 is a plan view showing an incidence path of light on an incident plane of another improved light guide plate of the conventional technique.

Light L emitted from a focal point P of the LED light source reaches the incident plane of the light guide plate 100 at a predetermined angle, and enters the light guide plate 100 while being refracted by the grooves 106. At this time, an incidence path is similar to that illustrated in FIG. 4. In other words, the light L enters the light guide plate 100 at the incidence angle wider than or equal to an orientation angle of the light.

In this case, if the width of each groove, that is, the minor axis x of the ellipse, is too large, such refraction effects of the grooves are low. In addition, if the width of each groove is too small, a scattering or reflection amount of light at each pinnacle 108 between the grooves 106 increases, causing reduction in amount of light entering the light guide plate 100. Accordingly, the overlapped distance (d), the major axis (y), and the minor axis (x) of the ellipses constituting the grooves are determined under consideration of these features, and optimum values thereof are described above.

The light L entering the light guide plate 100 of the invention at the wide orientation angle provides back light to an LCD panel through an emitting plane of the light guide plate via the path as described in FIG. 1. Here, the emitting plane is the upper surface among the upper and lower surfaces 102 in this embodiment.

There will be described hereinafter advantages of the light guide plate 100 according to the present invention with reference to FIG. 11.

Figure 11:
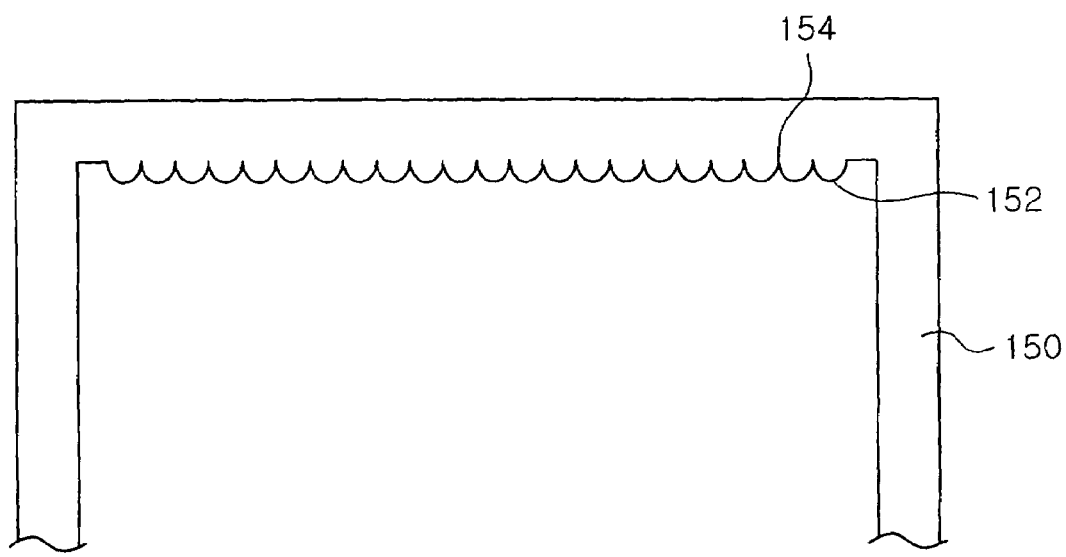
FIG. 11 is a cross-section view showing a portion of a mold used for the light guide plate according to the present invention.

In FIG. 11, a partial cross-section of a mold 150 used to manufacture the light guide plate 100 of the invention is shown.

An inner surface of the mold 150 is formed with protrusions 152 corresponding to the grooves 106 of the light guide plate 100 according to the invention. The protrusions 152 have a convex shape, and each valley 154 between the protrusions 152 corresponds to the pinnacle 108 between the grooves 152.

The mold 150 provides advantages as follows when manufacturing the light guide plate.

Figure 6:
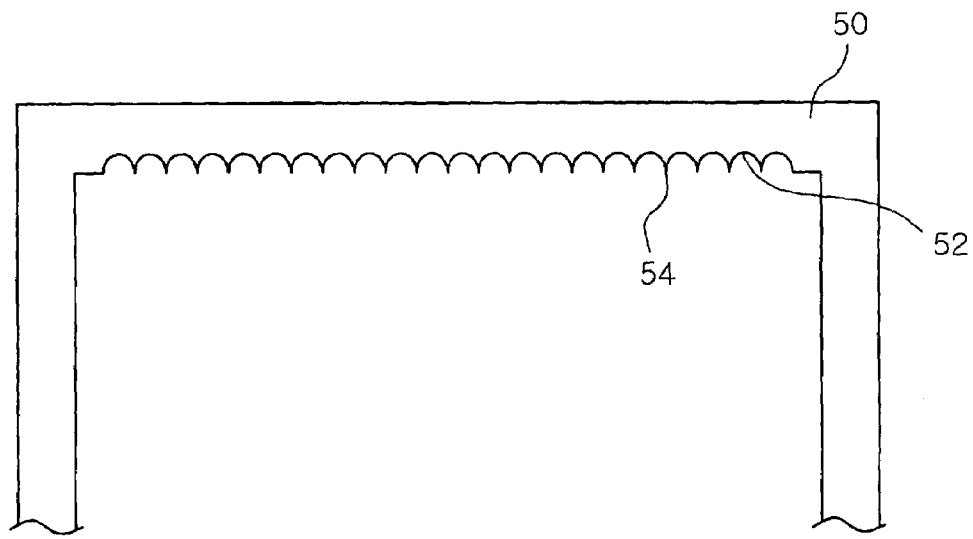
FIG. 6 is a cross-section view showing a portion of a mold used for the light guide plate shown in FIG. 5.

Since distal ends of the protrusions 152 in the mold are rounded as shown in FIG. 11, it is easy to form the protrusions 152 of the mold, and the light guide plate is not likely to be broken when injection molding the light guide plate with a transparent resin by means of the mold. Meanwhile, a release agent is applied to the inner surface of the mold 150 in order to allow the mold 150 to be easily separated from the light guide plate after molding the light guide plate with the mold 150 filled with the resin. In this regard, since the protrusions 152 of the mold have the distal ends with a gentle slope, the release agent can be sufficiently applied to the distal ends of the protrusions 152. As a result, the mold 150 is prevented from being brought into direct contact with the resin which is cured into the light guide plate, and there is no problem when opening the mold 150. Therefore, it is possible to solve the problems of the conventional technique which employs the mold as shown in FIG. 6.

There will be described a profile of light intensity near an incident plane of a light guide plate according to the present invention along with that of the conventional light guide plate with reference to FIGS. 12 and 13.

Figure 2:
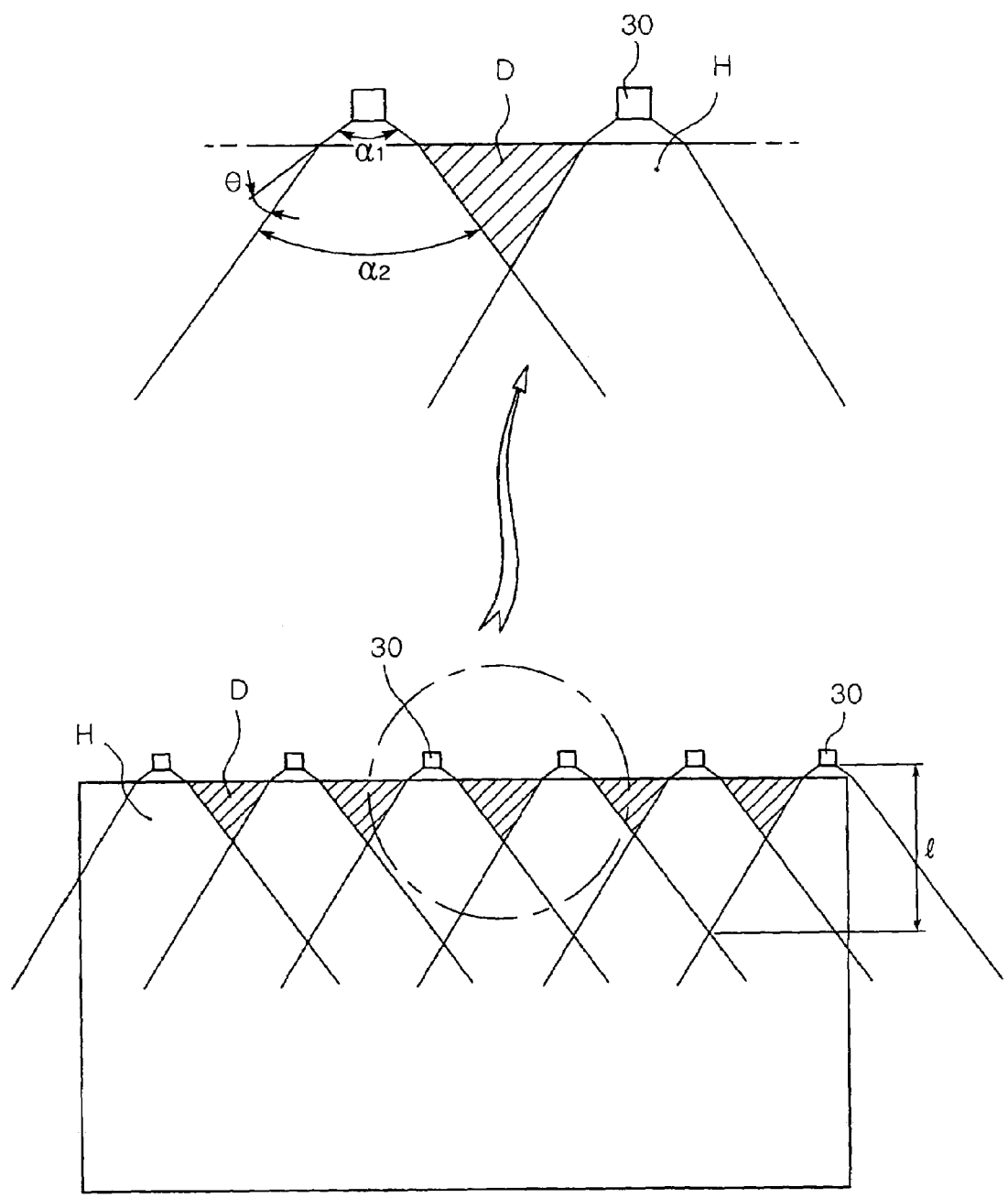
FIG. 2 is a plan view showing an incidence angle of light on an incident plane of a conventional light guide plate.
Figure 3:
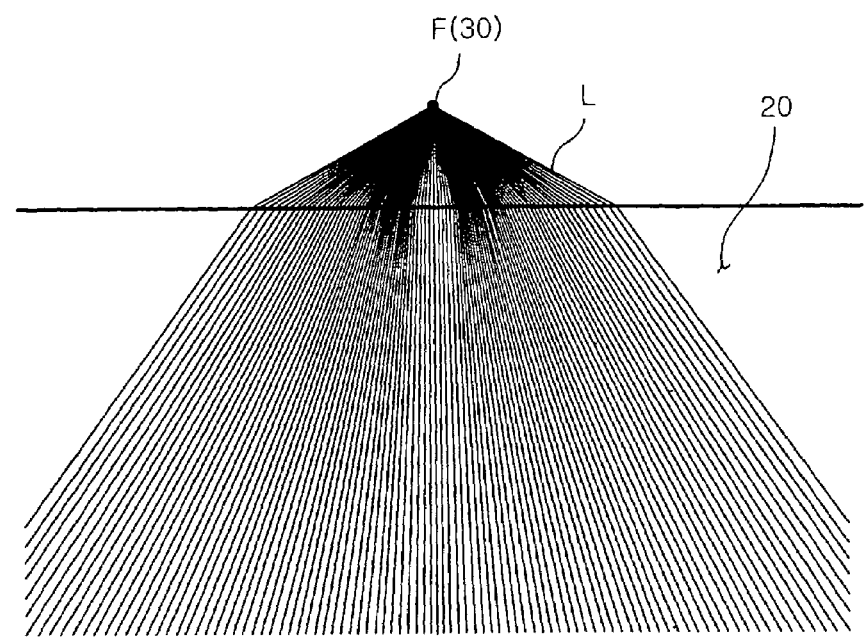
FIG. 3 is a detailed plan view showing an incidence path of light on the incident plane shown in FIG. 2.
Figure 12:
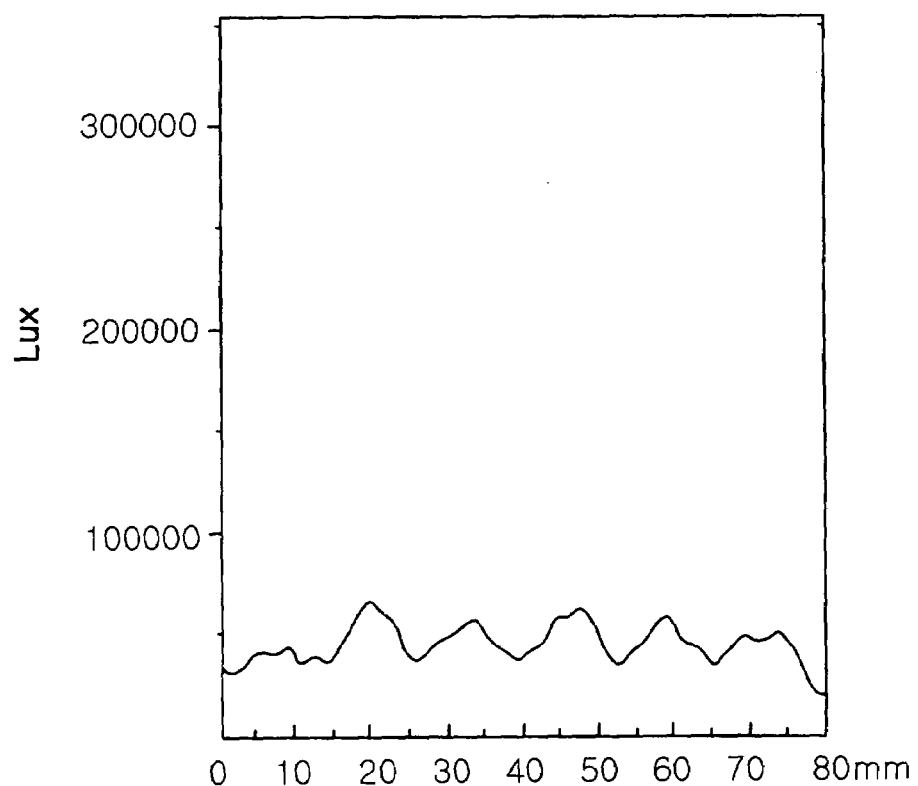
FIG. 12 is a graph depicting a profile of light intensity near the incident plane of the conventional light guide plate.

FIG. 12 shows a profile of light intensity on an incident plane of the conventional light guide plate as shown in FIG. 2, with six LED light sources disposed thereby. The light guide plate was 80 mm in width, and each of the LED light sources had power of 5 W. As shown in FIG. 12, six high peaks corresponding to the LED light sources were observed on the incident plane of the light guide plate.

Figure 13:
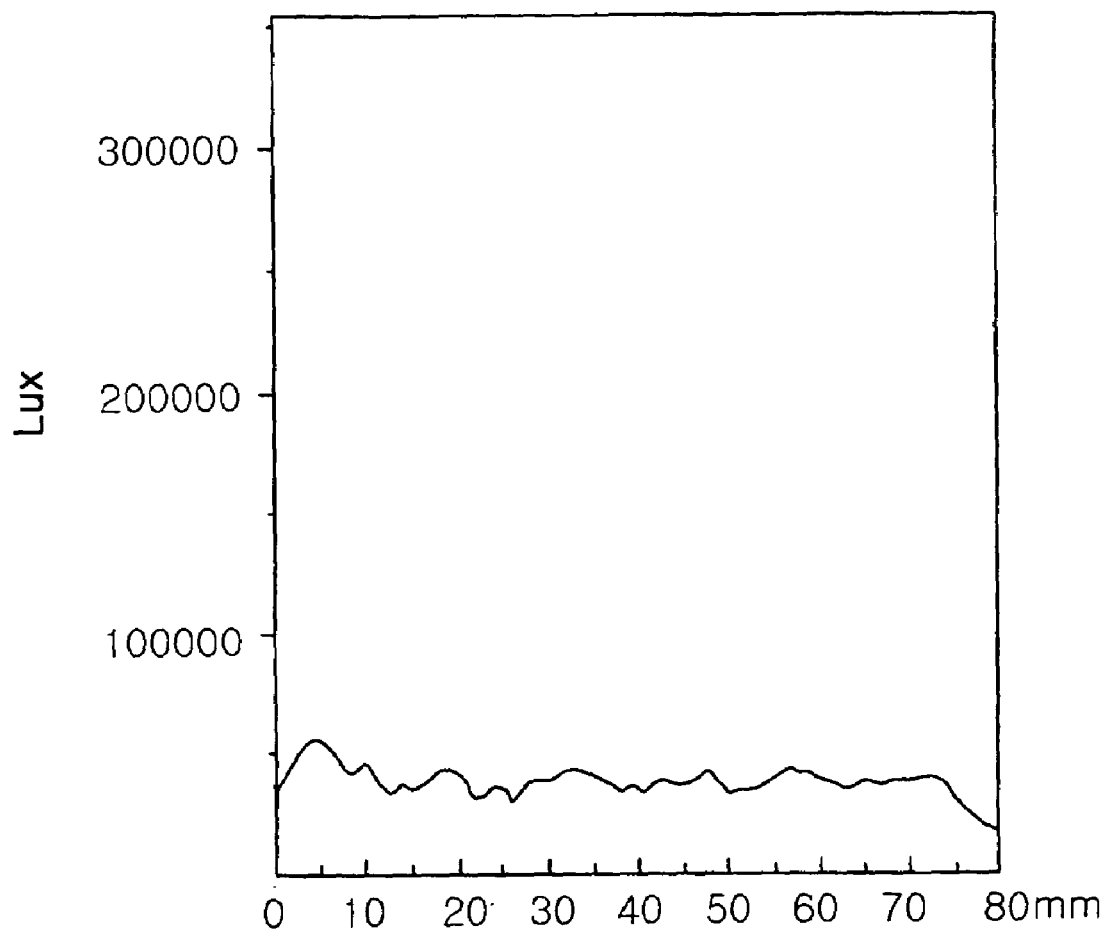
FIG. 13 is a graph depicting a profile of light intensity near the incident plane of the light guide plate according to the present invention.

FIG. 13 shows a profile of light intensity on an incident plane of the light guide plate according to the present invention, with six LED light sources disposed thereby. The light guide plate is 80 mm in width, and each of the LED light sources has power of 5 W. As shown in FIG. 13, although a higher peak was observed at the leftmost part on the incident plane of the light guide plate, it could be seen that the profile of light intensity was uniform on the overall incident plane.

With this result, it can be understood that the light guide plate of the present invention has a more uniform profile of light intensity than that of the conventional light guide plate.

Figure 14:
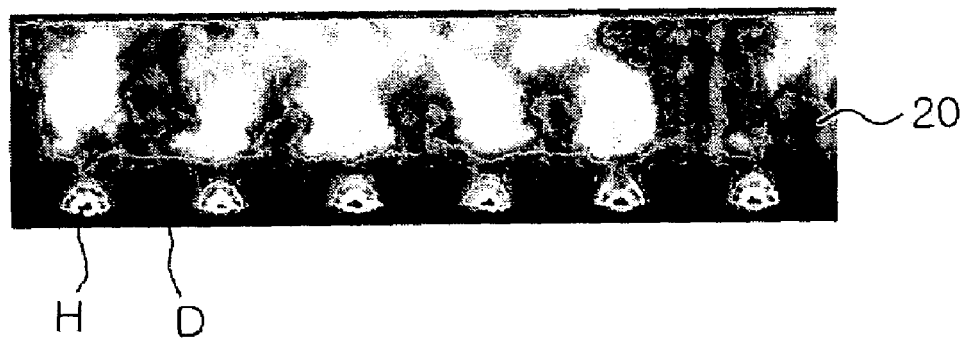
FIG. 14 is a view showing distribution of light spots and dark spots near the incident plane of the conventional light guide plate.
Figure 15:
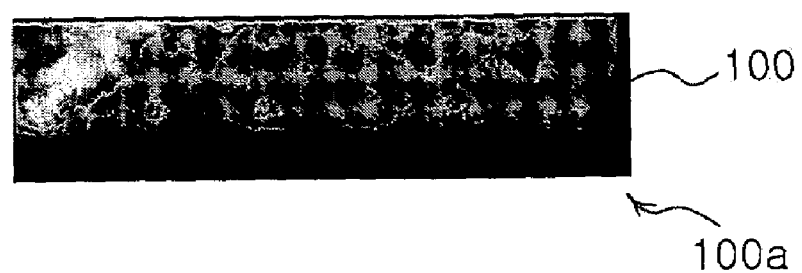
FIG. 15 is a view showing distribution of light spots and dark spots near the incident plane of the light guide plate according to the present invention.

Referring to FIGS. 14 and 15, distributions of light and dark spots on the conventional light guide plate and the light guide plate of the present invention are shown. The light guide plates and the LED light sources used in this comparison are the same as those of FIGS. 12 and 13.

Referring to FIG. 14, light spots H and dark spots D are alternately observed on the conventional light guide plate 20, and it can be found that the light spots H directly face the LED light sources.

Meanwhile, referring to FIG. 15, the light spots H and dark spots D are hardly distinguished from each other on the light guide plate 100 of the invention. In other words, it can be found that the light guide plate 100 exhibits uniform distribution of light and dark on the overall incident plane at the leading end 100*a* of the light guide plate 100.

With this result, it can be seen that the light guide plate of the present invention is substantially free from the dark spots, thereby reducing a combined region of the light and dark spots. When considering the reduction of the combined region is one of the most important factors for miniaturization of the backlight unit, it can be clearly understood that the reduction of the combined region is one of the advantages of the present invention.

Figure 16:
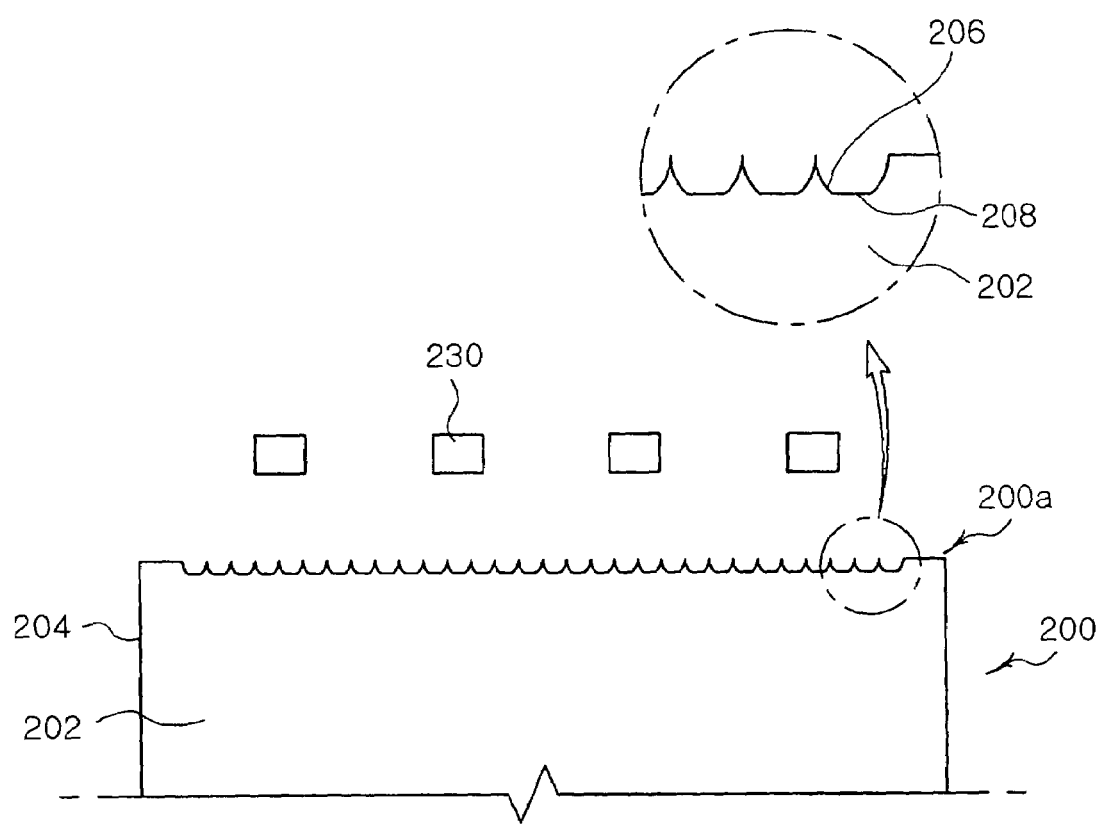
FIG. 16 is a plan view of a variant of the light guide plate according to the present invention.

FIG. 16 is a plan view of a variant of the light guide plate according to the present invention Referring to FIG. 16, a light guide plate 200 of the variant has the same construction as that of the light guide plate 100 of FIG. 7 except that a bottom surface 208 of each groove 206 is flat. Thus, the same components are denoted by reference numerals increased by one hundred, and description thereof will be omitted. Here, an extension of the overall bottom surface 208 is preferably coplanar, and parallel to an incident plane at a leading end 200*a* of the light guide plate.

As apparent from the above description, the light guide plate of the LED backlight unit according to the present invention has a plurality of elliptic cylinder-shaped grooves carved into an incident plane of the light guide plate in a thickness direction, thereby widening an incidence angle of which light can be transmitted therethrough. In addition, the light guide plate has rounded grooves formed on the incident plane of the light guide plate, and a pinnacle between the grooves, enabling easy operation of producing a mold for the light guide plate while ensuring easy and stable production of the light guide plate using the mold.

It should be understood that the embodiments and the accompanying drawings have been described for illustrative purposes, and the present invention is limited only by the following claims. Further, those skilled in the art will appreciate that various modifications, additions and substitutions are allowed without departing from the scope and spirit of the invention according to the accompanying claims.

What is claimed is:

1. A planar light guide plate for a backlight unit having an LED light source, comprising: a pair of wide planes facing each other; and a narrow plane formed between the pair of wide planes and constituting a thickness of the light guide plate, wherein the narrow plane has an incident plane constituted on a section of the narrow plane facing the LED light source, the incident plane having a plurality of elliptic cylinder-shaped grooves carved into the incident plane in a thickness direction of the light guide plate, and one of the wide planes constitutes an exiting plane from which light entered from the LED light source exits, wherein the carved elliptic cylinder-shaped grooves extend in a thickness direction of the exiting plane of the light guide plate such that ellipses corresponding to the respective elliptic cylinder-shaped grooves are partially overlapped with each other.

2. The planar light guide plate according to claim 1, wherein each overlapped portion between the ellipses forms a pinnacle extending outward from the incident plane between the elliptic cylinder-shaped grooves.

3. The planar light guide plate according to claim 1, wherein each overlapped portion between the ellipses has a width 10-30% of that of the ellipses.

4. The planar light guide plate according to claim 1, wherein the ellipses have a ratio of a major axis to a minor axis in the range of 1.5:1 to 3:1.

5. The planar light guide plate according to claim 4, wherein the ellipses have a ratio of a major axis to a minor axis in the range of 1.8:1 to 2.2:1.

6. The planar light guide plate according to claim 1, wherein each of the ellipses has a major axis of 2 to 6 mm in length, and a minor axis of 1 to 3 mm in length.

7. The planar light guide plate according to claim 1, wherein each of the elliptic cylinder-shaped grooves is formed on a plane in which an extension between both ends of the major axis of the ellipse indented into the incident plane is parallel to the incident plane.

* * * * *